(12) United States Patent
Stirling-Gallacher et al.

(10) Patent No.: US 8,290,443 B2
(45) Date of Patent: Oct. 16, 2012

(54) ITERATIVE BEAM SELECTION METHOD WITH RECEIVER AND TRANSMITTER DIVERSITY

(75) Inventors: Richard Stirling-Gallacher, Stuttgart (DE); Juan Nogueira-Nine, Stuttgart (DE)

(73) Assignee: Sony Corporation, Tokyo (JP)

( * ) Notice: Subject to any disclaimer, the term of this patent is extended or adjusted under 35 U.S.C. 154(b) by 266 days.

(21) Appl. No.: 12/631,174

(22) Filed: Dec. 4, 2009

(65) Prior Publication Data

US 2010/0190450 A1    Jul. 29, 2010

(30) Foreign Application Priority Data

Jan. 23, 2009   (EP) .................................. 09151192

(51) Int. Cl.
*H04B 17/00* (2006.01)
(52) U.S. Cl. ............... 455/67.13; 455/63.1; 455/63.4; 455/69; 455/67.11; 455/561; 455/562; 375/260; 375/267; 370/343; 370/480
(58) Field of Classification Search .......... 455/67.13, 455/63.1, 63.4, 69, 67.11, 561, 562, 7.13; 375/260, 267; 370/343, 480
See application file for complete search history.

(56) References Cited

U.S. PATENT DOCUMENTS

| | | | |
|---|---|---|---|
| 6,584,302 B1 | 6/2003 | Hottinen et al. | |
| 6,888,501 B2 | 5/2005 | Hirayama et al. | |
| 7,696,943 B2 * | 4/2010 | Chiang | 343/833 |
| 2006/0105813 A1 * | 5/2006 | Nakao | 455/562.1 |
| 2006/0116092 A1 * | 6/2006 | Uno et al. | 455/134 |
| 2007/0054700 A1 | 3/2007 | Hovers et al. | |
| 2007/0205943 A1 * | 9/2007 | Nassiri-Toussi et al. | 342/377 |
| 2007/0280367 A1 | 12/2007 | Nakao et al. | |
| 2007/0291870 A1 | 12/2007 | Ponnekanti | |
| 2008/0096488 A1 * | 4/2008 | Cho et al. | 455/69 |
| 2008/0187067 A1 * | 8/2008 | Wang et al. | 375/267 |

FOREIGN PATENT DOCUMENTS

| | | |
|---|---|---|
| EP | 1 659 813 A1 | 5/2006 |
| EP | 1 956 732 A1 | 8/2008 |
| EP | 1 976 149 A1 | 10/2008 |

OTHER PUBLICATIONS

Wan Choi et al., "Opportunistic Space-Division Multiple Access With Beam Selection", 2009 IEEE (only available as an abstract), 1 page.
Junyi Wang, "Robust and Highly Efficient Beamforming Procedures for 60GHz WPAN ~Beam-Searching and -Tracking~", IEEE 802.15-08-0190-00-3c, Mar. 20, 2008, 12 pages.

(Continued)

*Primary Examiner* — Temesgh Ghebretinsae
*Assistant Examiner* — Md Talukder
(74) *Attorney, Agent, or Firm* — Oblon, Spivak, McClelland, Maier & Neustadt, L.L.P.

(57) ABSTRACT

The present invention relates to a method for determining the best transmitter and receiver beams with a reduced number of calculations for the best antenna beam arrangement between a transmitter and a receiver. The iterative routine within this method comprises a transmitter beam determination sequence, a feedback sequence and a receiver beam determination sequence. While calculating the best possible antenna beam arrangement, the antenna beam width does not require to be reduced.

10 Claims, 4 Drawing Sheets

OTHER PUBLICATIONS

Figure 1:
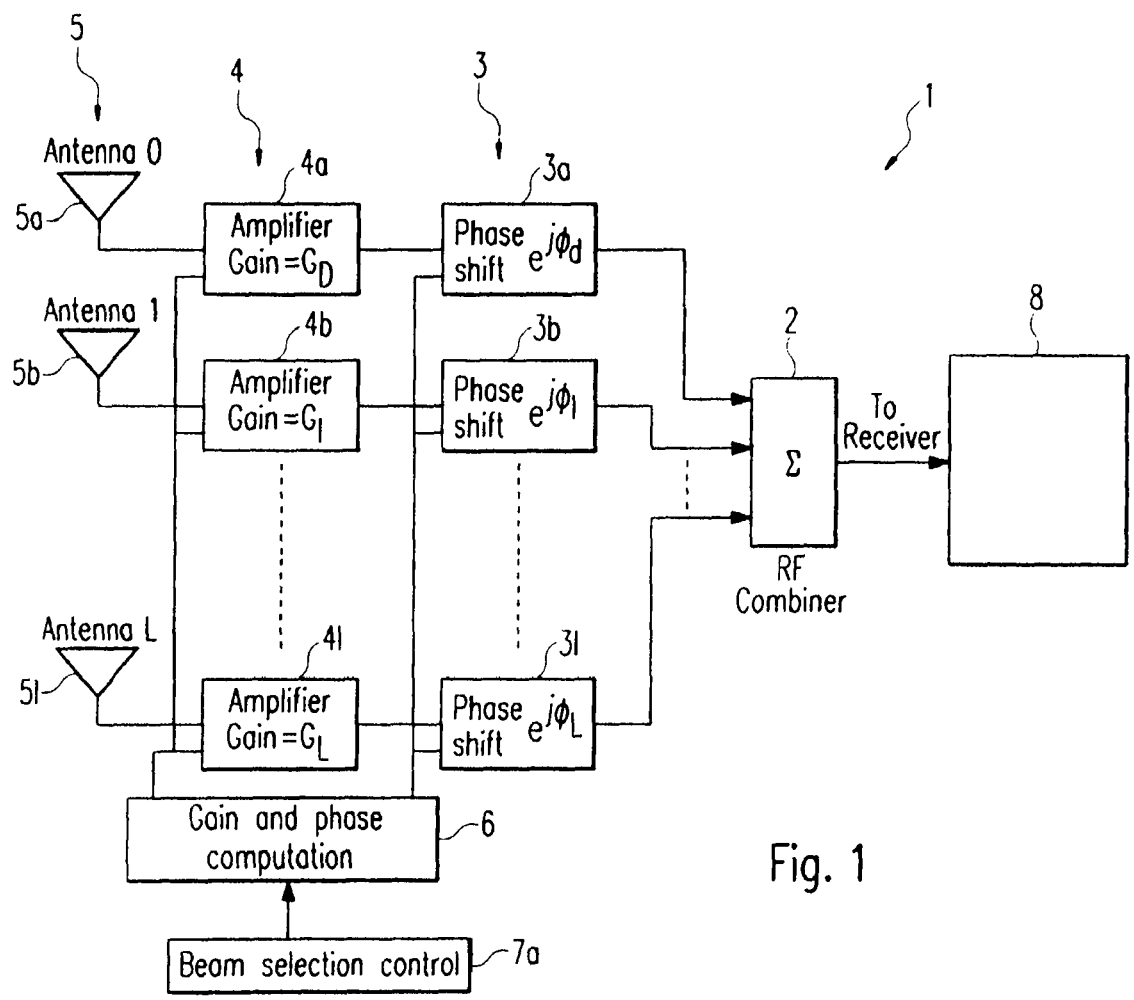

Ismail Lakkis et al., "Beamforming", IEEE P802.15 Working Group for Wireless Personal Area Networks (WPANs), IEEE 802.15-08-0361-00-003c, May 13, 2008, 46 pages.

Ismail Lakkis et al., "mm Wave Multi-Resolution Beamforming", IEEE P802.15 Working Group for Wireless Personal Area Networks (WPANs), IEEE 802.15-08-0182-00-003c, Jan. 15, 2008, 39 pages.

Ismail Lakkis et al., "mm Wave Beamforming", IEEE P802.15 Working Group for Wireless Personal Area Networks (WPANs), IEEE 802.15-08-0055-01-003c, Jan. 15, 2008, 64 pages.

Gordon L. Stueber et al. "Broadband MIMO-OFDM Wireless Communication", pp. 1-21.

* cited by examiner

ITERATIVE BEAM SELECTION METHOD WITH RECEIVER AND TRANSMITTER DIVERSITY

FIELD OF THE INVENTION

Many communication systems use antenna beams (or adaptive beam forming) for radio communication systems to increase the signal to noise ratio (SNR). Alternatively if interference is present, antenna beams would typically be used to increase the signal to interference plus noise ratio (SINR) by increasing the wanted signal power and/or decreasing the power of the unwanted interference.

The challenge, however, is how to select the best beam combination for a given transmitter/receiver pair. If it is assumed that the beam arrangement at the transmitter and receiver has Q possible beams each, which leads to Q different radiation patterns each, the total number of possibilities for the transmitter/receiver pair is $Q^2$. This means that even for small antenna arrays with limited number of possible radiation patterns, the total number of possible combinations for a given transmitter/receiver pair can be very large and the time needed to test all of these combinations one by one, known as the 'brute force' approach, would be excessively long.

Thus, this invention relates to a method which selects the best beam arrangement for a transmitter/receiver pair for a given situation in a communication system.

BACKGROUND OF THE INVENTION

The US Patent 2007/0205943 A1 and the IEEE 802.15.3c standard contributions "mm Wave Beam forming" and "mm Wave Multi-Resolution Beamforming" respectively propose beam forming methods whereby antenna training is achieved, by sending or receiving test signals, where for each test signal the phases of the phase shifters in the antenna array corresponds to a column or row of an unitary matrix. By sending or receiving sufficient test signals to cover all the rows or columns of the unitary matrix the receiver can calculate the optimum settings for the phase shifters. Such a calculation utilises the special properties of the unitary matrix which simplifies calculating the matrix inverse.

The IEEE 802.15.3c standard contributions "Robust and Highly Efficient Beamforming Procedures for 60 GHz WPAN~Beam Searching and Tracking~" and "Beamforming" propose a beam forming method which has multiple stages, whereby in each stage finer beam widths are used to send test sequences to determine the best transmitter/receiver beam combination. The first stage of the method therefore strives to determine from which sector the best antenna combination for the transmitter and receiver is located. Subsequent stages use this information to determine the search areas for finer and narrower beams.

A drawback of state of the art beam forming methods using the unitary matrix approach is, that for antenna arrangements which have a low number of antennas (e.g. less than 8), there are some issues with orthogonally of the rows and columns of the unitary matrix when some antenna elements are not functioning as expected.

Other drawbacks of state of the art beam forming methods are based on decreasing the beam width with each step:

First, for optimum performance in some situations, the best radiation pattern which leads to best link performance may not be one with only one angular peak, but maybe one with multiple angular peaks. An example of this is when the transmitter and receiver are located in a small room and the line of sight transmission path is blocked. In such a scenario, it may be advantageous to transmit the signal simultaneously via multiple separate walls, which requires a radiation pattern with multiple angular peaks. Due to the 'zooming in' aspect of this approach, only a beam with one angular peak can be selected with this approach.

Second, when the best optimum fine beam is located between two coarse beams, there will sometimes be an error in selecting the wrong coarse beam in an early step. This ultimately leads to a non optimum fine beam being selected in a subsequent steps and results in degraded link performance.

Thus, it is an object of the present invention to reduce the required performance to calculate and acquire the best beam arrangement between a receiver and a transmitter.

SUMMARY OF THE INVENTION

The present invention relates to a method for determining at least one beam of each transmitter and at least one beam of each receiver with a specific signal transmission quality between each transmitter and each receiver, respectively, wherein each transmitter and each receiver comprise a plurality of predetermined transmitter and receiver beams, respectively.

Said method comprises a radiation pattern determination routine with the steps of transmitting a transmitter training burst for each receiver from a transmitter to the respective receiver, consecutively, wherein the plurality of predetermined transmitter beams of the transmitter is applied during each transmitter training burst in a sequence;

transmitting at least one feedback burst to the transmitter, wherein the feedback burst comprises information based on each transmitter training burst received by the respective receiver, wherein said information identifies at least one transmitter beam of the plurality of predetermined transmitter beams of the transmitter with a specific signal transmission quality for each receiver;

transmitting a receiver training burst for each receiver from the transmitter to the respective receiver, consecutively, wherein the respective transmitter beam with a specific signal transmission quality of the identified at least one transmitter beam of the transmitter from the respective receiver is applied during each receiver training burst;

receiving the receiver training burst by the respective receiver, wherein the plurality of predetermined receiver beams of the respective receiver is applied during each receiver training burst in a sequence; and identifying at least one receiver beam of the plurality of predetermined receiver beams of the respective receiver with a specific signal transmission quality.

Favorably, the radiation pattern determination routine is repeated at least once, whereby the identified at least one transmitter beam and the identified at least one receiver beam of the preceding radiation pattern determination routine are used as the new assortment of the plurality of predetermined transmitter and receiver beams of the succeeding radiation pattern determination routine for the respective transmitter and the respective receiver.

Favorably, the radiation pattern determination routine is repeated for a predetermined number of times.

Favorably, within the radiation pattern determination routine the number of the identified at least one transmitter beam and the identified at least one receiver beam is smaller than the number of the plurality of predetermined transmitter and receiver beams, respectively.

Favorably, the receiver beam is set to an at least quasi-omnidirectional beam, while transmitting the transmitter training burst for the first time.

Favorably, the signal transmission quality and the identification of the respective beams are based on the resulting estimated channel delay profile, the channel estimate, the estimated received signal to noise ratio, the estimated carrier to interference ratio and/or the channel characteristics.

Favorably, the transmitter and/or the receiver store the best identified transmitter and receiver beams, respectively.

In addition, the invention refers to a transmitter apparatus operable to generate a plurality of predetermined transmitter beams and to determine at least one transmitter beam for each receiver apparatus with a specific signal transmission quality between the transmitter apparatus and the respective receiver apparatus.

Said transmitter apparatus comprises at least one antenna operable to transmit electromagnetic signals, and a transmitter beam determination routine, wherein the transmitter apparatus operates to transmit a transmitter training burst for each receiver to the respective receiver, consecutively, wherein the plurality of predetermined transmitter beams is applied during each transmitter training burst in a sequence;

to receive at least one feedback burst, wherein the feedback burst comprises information based on the at least one transmitter training burst received by the respective receiver, wherein said information identifies at least one transmitter beam of the plurality of predetermined transmitter beams with a specific signal transmission quality for each receiver; and to transmit a receiver training burst for each receiver to the respective receiver, wherein a transmitter beam with a specific signal transmission quality of the identified at least one transmitter beam is applied during the receiver training burst.

Favorably, the transmitter apparatus operates to repeat the transmitter beam determination routine at least once, whereby the identified at least one transmitter beam of the preceding transmitter beam determination routine is used as the new assortment of the plurality of predetermined transmitter beams of the succeeding transmitter beam determination routine.

Favorably, the transmitter beam determination routine is repeated for a predetermined number of times.

Favorably, within the transmitter beam determination routine the number of the identified at least one transmitter beam is smaller than the number of the plurality of predetermined transmitter beams.

Moreover, the invention relates to a receiver apparatus operable to generate a plurality of predetermined receiver beams and to determine at least one receiver beam for each transmitter apparatus with a specific signal transmission quality between the receiver apparatus and the respective transmitter apparatus.

Said receiver apparatus comprises at least one antenna operable to receive electromagnetic signals, and a receiver beam determination routine, wherein the receiver apparatus operates to receive a transmitter training burst for each transmitter from the respective transmitter, consecutively, wherein a plurality of predetermined transmitter beams is applied during each transmitter training burst in a sequence;

to transmit at least one feedback burst to each transmitter, wherein the feedback burst comprises information based on the at least one transmitter training burst received by the receiver apparatus, wherein said information identifies at least one transmitter beam of the plurality of predetermined transmitter beams with a specific signal transmission quality for each transmitter;

to receive a receiver training burst for each transmitter from the respective transmitter, consecutively, wherein a plurality of predetermined receiver beams is applied during the receiver training burst in a sequence; and to identify at least one receiver beam of the plurality of predetermined receiver beams with a specific signal transmission quality.

Favorably, the receiver apparatus operates to repeat the receiver beam determination routine at least once, whereby the identified at least one receiver beam of the preceding receiver beam determination routine is used as the new assortment of the plurality of predetermined receiver beams of the succeeding receiver beam determination routine.

Favorably, the receiver beam determination routine is repeated for a predetermined number of times.

Favorably, within the receiver beam determination routine the number of the identified at least one receiver beam is smaller than the number of the plurality of predetermined receiver beams.

Favorably, the receiver beam is set to an at least quasi-omnidirectional beam, while transmitting the transmitter training burst for the first time.

SHORT DESCRIPTION OF THE FIGURES

Figure 2:
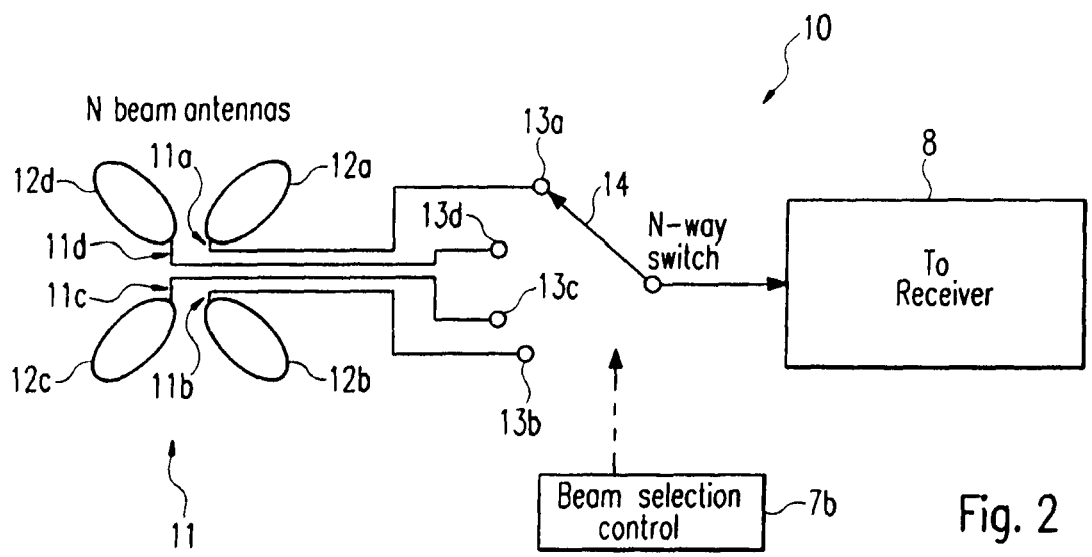
Figure 3:
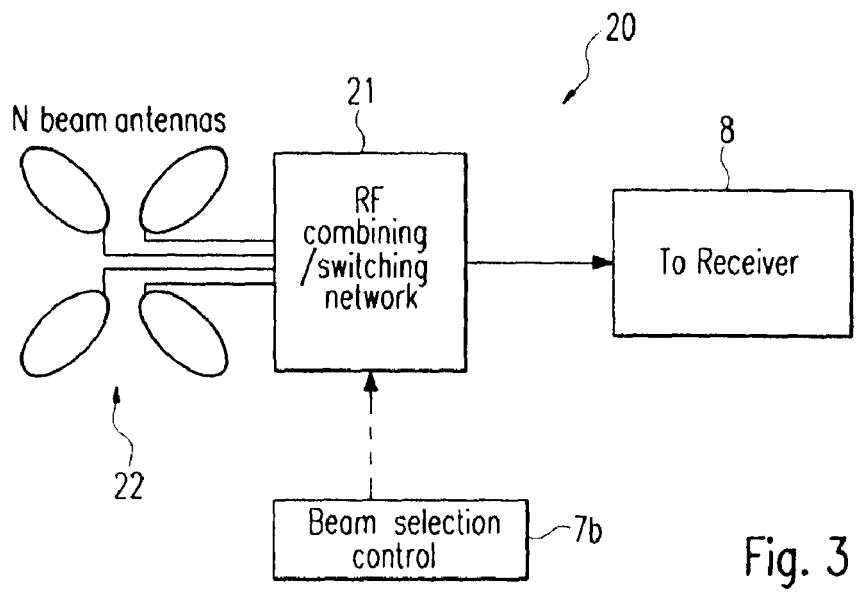
Figure 4:
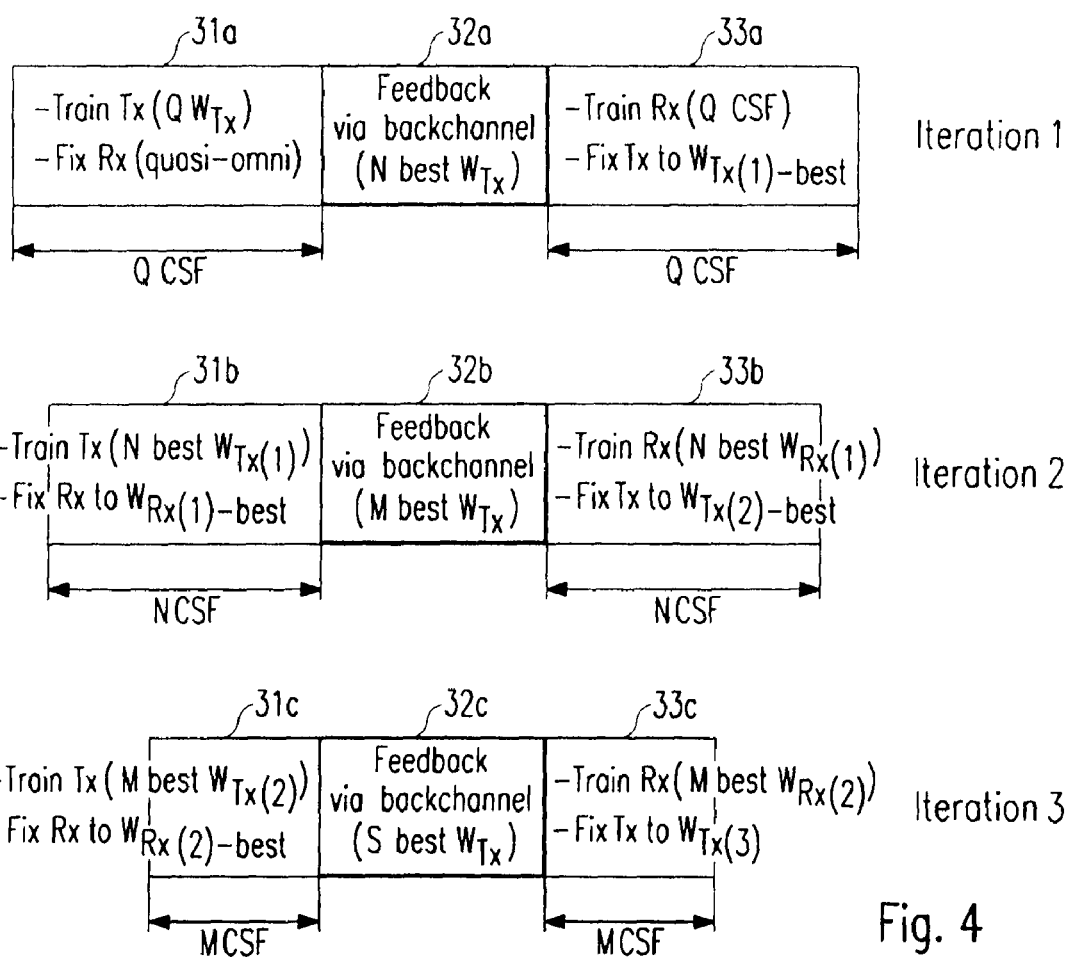
Figure 5:
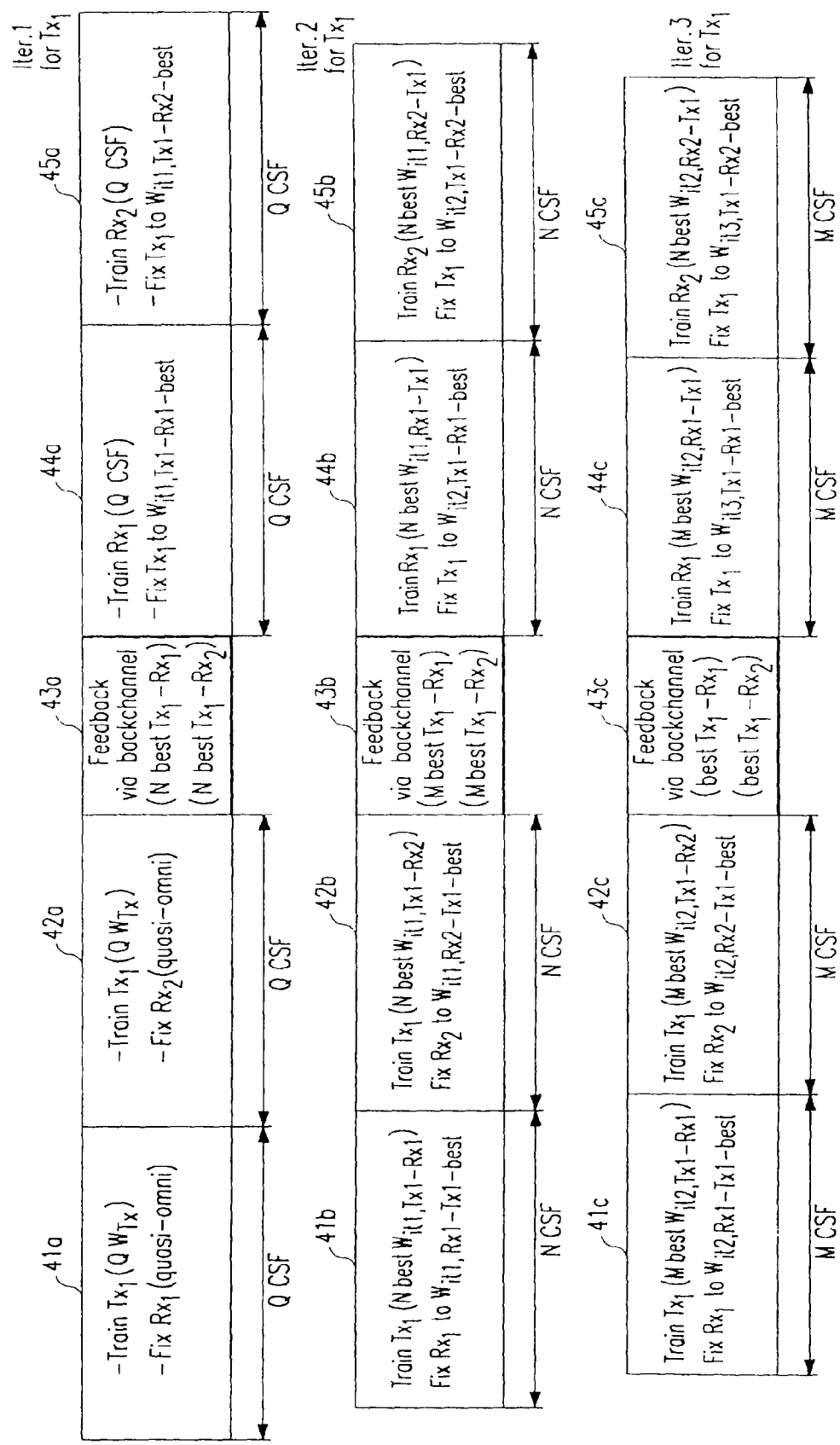
Figures 6, 7:
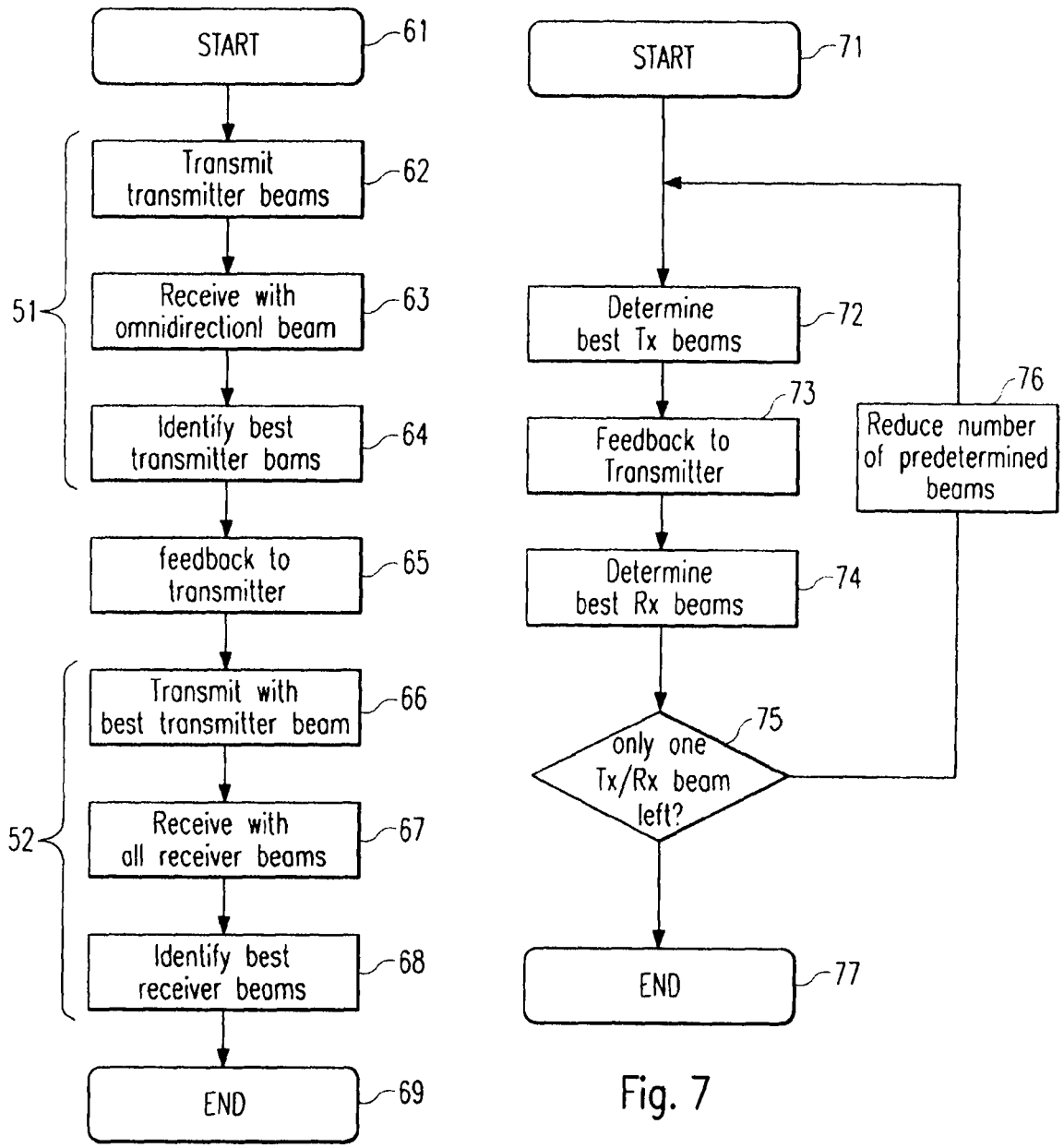

The embodiments of the present invention described by the present invention will become clearer in view of the following figures, wherein FIG. 1 shows an example of a beam forming arrangement utilizing adaptive beam forming, FIG. 2 shows another example of a beam forming arrangement utilizing fixed beam switching, FIG. 3 shows another example of a beam forming arrangement utilizing beam combining, FIG. 4 shows an example of a beam forming method using three iterative steps suitable for a system with one transmitter and one receiver, FIG. 5 shows another example of a beam forming method using three iterative steps suitable for a system with two transmitters and two receivers, FIG. 6 shows a flow chart of a beam forming method, and FIG. 7 shows another flow chart of a beam forming method.

DETAILED DESCRIPTION OF THE INVENTION

This invention uses iterative steps to calculate the best beams for a transmitter and receiver pair in a communication system, whereby the transmitter and receiver are trained one at a time in each iterative step. In case of a plurality of transmitters and receivers, favorably each of them is separately trained.

Generally this holds true for each antenna, in case a transmitter or receiver comprises a plurality of antennas. But to reduce the number of combinations of such a transmitter or receiver, only specific or a limited number of radiation patterns will be used during the iterative step.

The basic approach for establishing a communication link uses one adaptive beam antenna at the transmitter and one adaptive beam antenna at the receiver. To achieve the best communication link, the respective transmitter beam and receiver beam have to be determined which provide the best transmission channel between the transmitter and the receiver.

A particular feature of this method is that in each successive iterative step, the number of candidate beam combinations for the transmitter and receiver are reduced, which thereby decreases the overall time needed to find the best combination. By candidate beam combinations, the plurality of predetermined antenna beams is meant.

Another feature of the method is the usage with receiver and/or transmitter diversity. This diversity may take the form of spatial and/or polarisation diversity. Now it should be clear, that an antenna beam might originate from a single directional antenna or is the result of several transmitting or receiving antennas interfering with each other like e.g. phased-array antennas.

The proposed invention is very different to the state of the art since in a first iterative step a number of test sequences is sent which corresponds to the complete set of possible beams (or radiation patterns). For each sent test sequence, the transmitter uses a different beam. The receiver then makes decisions as which of these test signals were the best and sends this information to the transmitter via a back channel. The transmitter then sends the same number of test signals using the best beam as identified by the receiver and examines which of the receiver beam combinations would be the best. The number of sent test signals can also depend on the number of transmitter or receiver beams. In subsequent iterative steps, the number of tested beams and corresponding transmitter and receiver test sequences is reduced and the accuracy of the best transmitter/receiver antenna beam combinations is improved. A more detailed description of the invention is given below in combination with the figures.

It is important to note that favorably no unitary matrix is used and in the first iterative step test sequences are sent corresponding to the complete set of all possible beams (or radiation patterns) of the transmitter and receiver, respectively. An unitary matrix is an orthogonal matrix of a subset of beam positions, whereby the matrix is a complex matrix comprising complex values.

Further from one iterative step to the next one, the beam width of the beam used is favorably not decreased, but merely the number of beams (or radiation patterns) to be tested is reduced. In another case, after a specific number of possible transmitter/receiver beams or combinations is left, the beam width can be reduced.

The main advantage of the proposed beam forming scheme compared to state of the art is that the proposed scheme can be used with a beam antenna with any number of antenna elements since no unitary matrix approach is favorably used and that the proposed method determines the best radiation pattern for maximum performance as opposed to being restricted to a narrow beam possibility.

In the following, it is useful to describe the different methods for creating the antenna beams at the transmitter and receiver. These methods are referred to as "adaptive beam forming", "fixed beam switching" and "beam combining" and are shown in the respective FIGS. 1 to 3. It is important to note that the use of the invention is not restricted to using these methods and is applicable to beams formed by other methods.

"Adaptive beam forming" typically uses a combination of fixed antenna branches, wherein the antennas favorably have omnidirectional characteristics and where each branch has a corresponding RF phase shifter and amplifier. The antennas could also comprise directional antennas.

FIG. 1 shows an example of a beam forming arrangement 1 utilizing fixed beam switching; in particular a receiver with L antenna branches is shown.

The arrangement 1 comprises an antenna 5, an amplifier 4, a phase shifter 3 and a RF combiner 2. In addition the amplifier 4 and the phase shifter 3 are connected to a gain and phase computation device 6 which is eventually connected to a beam selection control 7a. The RF combiner 2 is connected to the receiver 8.

Actually, the antenna 5 comprises a plurality of single antennas 5a, 5b to 5l. The amplifier 4 comprises the single amplifiers 4a, 4b to 4l. And the phase shifter 3 comprises a plurality of single phase shifters 3a, 3b to 3l.

By changing the phase shifter for each branch, the angle of received signal for which the combined L branches has the highest gain is changed and therefore the received beam can be steered. By changing the amplifier gain for each branch, the weight of the individual branches in the combiner is changed and therefore the exact beam receiver sensitivity against angle can be changed. If only a certain set of the beams needs to be used for "adaptive beam forming", the exact gain and phases required for the different branches can be computed on-line or stored in a look up table like in the gain and phase computation device 6; and these beams can then be selected.

The single antenna 5a is connected to the amplifier 4a which is in turn connected to the phase shifter 3a, whereby said phase shifter 3a is connected to the RF combiner 2. This connection between the antennas, amplifiers and phase shifters is the same for each single antenna 5a to 5l, amplifier 4a to 4l and phase shifter 3a to 3l, whereby each phase shifter 3a to 3l is respectively connected to the RF combiner 2.

The RF combiner 2 is operable to receive all signals from the antennas 5a to 5l previously processed by the respective amplifier and/or phase shifter and combine them to a single output signal which is sent to the receiver 8. The antennas 5a to 5l are respectively operable to receive electromagnetic signals and provide them to the respective amplifiers 4a to 4l. In another case, the antennas 5a to 5l can rotate, move and/or are directional; but favorably the antennas are omni-directional and the creation of a special radiation pattern is necessary. The amplifiers 4a to 4l are operable to amplify or attenuate the received signals. The phase shifters 3a to 3l are operable to change the phase or induce a phase shift to the received and amplified signal and output the signal to the RF combiner 2. The receiver 8 itself is operable to receive the signal from the RF combiner 2 and process and demodulate this signal.

The gain and phase computation device 6 is operable to respectively control each of the amplifiers 4a to 4l and the phase shifters 3a to 3l. Due to this operation of the device 6, different receiver beams can be selected and generated which can differ in direction and/or intensity. As mentioned above, the device favorably stores the settings of specific receiver beams in a table or another storage device, which thus can be selected by the beam selection control 7a.

For a transmitter, a similar arrangement as shown in FIG. 1 is used but in that case the signals travel from right to left and the RF combiner is replaced by a power splitter. Furthermore, instead of a receiver 8 a transmitter is used. The signal of the transmitter is split to the different antennas 5a to 5l instead of being combined.

An alternative approach to form a beam at the receiver or transmitter is to perform the phase shifting and different amplification for the different antennas branches in baseband.

FIG. 2 shows another example of a beam forming arrangement 10 utilizing fixed theme switching.

For this method, one of the N fixed beam antennas is connected to the receiver or alternatively to a transmitter via a switch. The N fixed beam antennas favorably comprise different radiation patterns or beams.

This arrangement 10 comprises an antenna 11 and a n-way switch 14, which is connected via the respective connection points 13a to 13d to the respective single antennas 11a to 11d of the antenna 11. The single antennas 11a to 11d are operable to generate the antenna beams 12a to 12d, respectively. The n-way switch 14 is also connected to the receiver 8 and is controlled by a beam selection control device 7b. By controlling the n-way switch 14, the different antennas 11a to 11d can be selected one at a time.

All devices shown in FIG. 2 like the receiver 8 and the beam selection control device 7b are similar to the devices shown in FIG. 1. But due to the fact that the antennas 11a to 11d can only be selected separately, the antenna beams 12a to 12d in FIG. 2 are directional ones. In another example, the several antennas could be selected at the same time to receive simultaneously, so the antenna beams could also be omnidirectional; but this case is more comparable with FIG. 3.

A variation of the "fixed beam switching' approach is the "beam combining" approach shown in FIG. 3. For this variation, again, N fixed beam, antennas with different radiation patterns are used, but the beam antennas can be selectively switched and RF combined yielding a higher number of possible radiation patterns.

For the standard beam selection arrangement using N fixed beam antennas (FIG. 2), there are N different radiation patterns (1 for each beam), whereas for the same number of fixed beam antennas, the beam combining arrangement (in FIG. 3) yields a total of $2^N-1$ active radiation patterns.

FIG. 3 shows another example of a beam forming arrangement 20 utilizing beam combining and switching.

The arrangement 20 comprises an antenna 22, an RF combining/switching network 21, a receiver 8 and a beam selection control device 7c. The antenna 22, the beam selection control device 7c and the receiver 8 are similar or equal to the antenna 11, the beam selection control 7b and the receiver 8 of FIG. 2, respectively.

The RF combining network 21 is operable to combine different antennas and thus their beams, so that different antennas simultaneously transmit and/or receive and a specific beam is generated. Eventually, the signals received by the different antennas are combined in a special way, so that constructive or destructive interference is achieved in a specific direction.

FIG. 4 shows an example of a beam forming method using three iteration steps suitable for a system with one transmitter and one receiver.

The first, second and third iteration comprise each a transmitter training burst 31a, 31b, 31c, a feedback burst 32a, 32b, 32c and a receiver training burst 33a, 33b, 33c, respectively. These bursts can also be time slots, respectively. The example shown uses 3 iterative steps, but of course any number of iterative steps can be used.

Between the time slots, there could be empty or specially marked time slots to avoid signal collisions or provide signal or process synchronization. The special time slot can also be inserted after every test signal.

As shown in figure after each iteration, the number of predetermined antenna beams to be used is reduced; therefore, the number of antenna beams used in the transmitter training burst 31a (Q CSF) is larger than the number of antenna beams used in the transmitter training burst 31b (N CSF). This is the same for the receiver training burst 33a (Q CSF), which is larger than the number of antenna beams used in the receiver training burst 33b (N CSF). Formula wise, it can be written S<M<N<Q, whereby each of the letters S, M, N, Q is a natural number and stands for a number of beams to be tested during its own iteration.

The feedback burst favorably maintains the same length in each iteration as shown in FIG. 4. In another case, the smaller the number of predetermined antenna beams gets, the less information needs to be sent back to the transmitter and the smaller the feedback burst can get, too (not shown).

The transmitter is sending a test signal using the complete set of directional antenna beams during the transmitter training burst of the first iteration, while the receiver is set to a constant antenna beam which is favorably quasi omni-directional or completely omni-directional. A quasi omni-directional beam is almost equally distributed in space and allows a receiver to capture a signal by using this "middle" beam or any other unitable beam and thus to capture at least a part of the transmitter beam position.

In detail, the transmitter antenna is first trained by transmitting Q test sequences, in which each of the test sequences are sent with a different radiation pattern from the Q possible transmitter radiation patterns available.

The different test sequences are labeled as CSF (channel sounding frames) on the figure. The weighting vector $W_{Tx}$, shown on the figure is the vector containing all of the phase (and amplitude) needed for each antenna element to generate one of the radiation patterns, if the beam forming is performed by the method as shown in FIG. 1.

During the feedback burst, the receiver identifies the antenna beams with the best transmission quality and sends these results to the transmitter via a back channel. The results are favorably forwarded in form of an ordered list of the best transmitter possibilities. For each sent sequence the receiver de-correlates the received signal and uses the output of the de-correlator to decide the quality of each of Q test sequences sent from the transmitter.

This quality measurement may be based on the resulting estimated channel delay profile, the channel estimate, the estimated received signal to noise ratio, the estimated carrier to interference ratio or some other criteria. From these quality measurements the receiver ranks the best N received sequences and sends the corresponding ranked transmitter antenna indexes back to the transmitter via the backchannel.

This back channel may or may not use the same frequency or the same channel as the forward link.

During the receiver training burst, the transmitter selects the antenna beam with the best transmission quality while the receiver changes the antenna beam using the complete set of antenna beams. Favorably, the antenna beam with the best transmission quality is used during the receiver training burst by the transmitter, but it can also be the case that an antenna beam with a specific transmission quality is used depending on the application the antenna beam is required for.

After the first iteration is complete, only a specific number of the best or specific antenna beams is maintained which are considered as the number of predetermined antenna beams for the succeeding iteration, in this case the second iteration. The second iteration is processed like the first iteration with the only difference that the number of predetermined antenna beams is reduced.

As can be seen from FIG. 4, subsequent iterations follow the same pattern in the sense that the number of tested radiation patterns for the transmitter training and receiver training is reduced. It is important to note that the receiver radiation pattern used during transmitter training is favorably the best receiver radiation pattern when the receiver was last trained and that the transmitter radiation pattern used during receiver training is favorably the best transmitter radiation pattern when the transmitter was last trained.

It should be clear that in another example the predetermined signal transmission qualities to be realized during the transmitter training burst and the receiver training burst from transmitter to receiver can be different.

For the final data transmission the transmitter and receiver radiation patterns are favorably set to the best radiation patterns from the latest ranked lists calculated in the final iteration for the transmitter and receiver, respectively.

The exact number of iterations needed and the reduction of tested sequences (and corresponding patterns) from one iteration to the next is an implementation issue and may depend upon the exact communication system, the total of number of possible radiation patterns Q and the environment for which the communication systems is to be used.

The number of iterations can be a fixed number or could be varying depending upon the distribution of values in the ranked list. The iteration could also depend on an internal countdown or until only one beam of the receiver and/or transmitter is identified. The number of iterations can also depend on how fast the antenna beams are reduced with every iteration; e.g. the faster the number of beams is reduced, the smaller the number of iterations will be.

Another feature of the proposed beam selection method is that, when it is necessary for the antennas at the transmitter and receiver to be quickly re-selected during a disturbance in the channel, it is useful to use the indexes in the latest ranked lists for the transmitter and receivers to form a small set of transmitter and receiver radiation patterns which can be relatively quickly re-evaluated. This is also useful for performing tracking, which can be performed at regular interval for updating the ranking of the list.

Favorably, the receiver maintains its own ranked list of the best receiver beams and the list will be updated every iteration. This list can comprise either the complete set of predetermined antenna beams or a small selection of said beams. While the receiver preferably comprises a list of its own antenna beams, it can also comprise information of the other receivers and/or transmitters. This can also correspond to a transmitter having a list of its own antenna beams.

The basic concept presented here can also be expanded when multiple antenna are used at the transmitter and receiver. An example of this is shown in FIG. 5, where the number of transmitter and receiver antennas is set to 2. It could also be the case, that two independent transmitters and two independent receivers are used in this example. It could be that each transmitter would need two different transmitter beams, when the receivers are spatially apart or independent.

Generally when $N_T$ separate antennas or beams are used at the transmitter to perform transmit diversity, each iteration will contain $N_T$ transmitter training bursts or time slots which will be used to train the different transmitters. Likewise, when $N_R$ separate antennas or beams are used at the receiver to perform receiver diversity, each iteration contains $N_R$ receiver training bursts or time slots which will be used to train the different receiver antennas. In some implementations, where multiple receivers can be used at the same time the number of transmitter training bursts or time slots in the first iteration maybe be reduced, since the multiple receivers be able to receive the initial transmitting training burst at the same time.

FIG. 5 shows another example of a beam forming method using three iterative steps suitable for a system with two transmitters and two receivers.

Each iteration comprises a first and a second transmitter training burst 41a & 42a, one feedback burst 43a and a first and a second receiver training burst 44a & 45a. In the first transmitter training bursts 41a, 41b and 41c, the first transmitter transmits a test signal using all antenna beams available while the first receiver is set to a quasi omni-directional antenna beam. Thereby, the antenna beams with the best transmission quality are identified by the first receiver.

Like described in FIG. 4, empty or marked time slots can be implemented, too.

In the second transmitter training bursts 42a, 42b and 42c, the first transmitter transmits like in the first transmitter training burst in all antenna beam directions a test signal, while the second receiver is set to a quasi omni-directional direction. So the second receiver can identify the antenna beams with the best transmission quality. During the feedback burst 43a, 43b and 43c, the receiver sends to the transmitter information about the antenna beams with the best transmission quality.

In the first receiver training burst 44a, 44b, 44c, the first transmitter is set to the best antenna beam for the first receiver, while the first receiver receives the test signal using all antenna beams and identifies the best transmission quality.

During the second receiver training burst 45a, 45b, 45c, the first transmitter is set to the antenna beam with the best transmission quality for the second receiver, while the second receiver changes the direction of all possible antenna beams to receive the test signal of the transmitter and to identify the antenna beams with the best transmission quality.

When one iteration is finished, the number of predetermined antenna beams is reduced and the next iteration is started with the new number of predetermined antenna beams. The iterations shown in FIG. 5 are only for the first transmitter. Afterwards, the same procedure has to be done for the second transmitter.

In another example, the training of the second transmitter could be also implemented in the same iteration step of the first transmitter. Thus, instead of two transmitter/receiver training bursts, there could be four transmitter/receiver bursts, respectively. Therefore, including the feedback burst, the new iteration step would comprise nine bursts instead of five bursts as shown in FIG. 5.

In another example, a plurality of transmitter and only one receiver exist. In this case, every transmitter consecutively sends its transmitter training burst to the receiver. Then the result is sent back via at least one feedback burst to the respective transmitter and the transmitter send the receiver training burst consecutively with the one identified transmitter beam to the receiver. Thereby, the receiver detects which receiver beam is the best or has a specific signal transmission quality.

FIG. 6 shows a flowchart of a beam forming method which comprises the start step 61, the 'transmitter beam determination' step 51, the feedback step 65, the 'receiver beam determination' step 52 and the end step 69. The 'transmitter beam determination' step 51 comprises the 'transmit transmitter beam' step 62, the 'receive with omni-directional beam' step 63 and the 'identify best transmitter beams' step 64, while the 'receiver beam determination' step 52 comprises the 'transmit with best transmitter beam' step 66, the 'receive with all receiver beams' step 67 and the 'identify best receiver beams' step 68.

Eventually, the flowchart in FIG. 6 shows how an iteration like in FIG. 4 is executed. In step 62, the transmitter transmits a test signal into all possible antenna beam directions. In step 63, the receiver is set to an omni-directional beam and receives all the transmitter beams if possible. And in step 64, the receiver identifies the transmitter beam with the best transmission quality of the test signal. The receiver can identify the test signal, since the test signal is marked as such a signal. Or the test signal comprises information or a signal pattern which allows the receiver to directly or indirectly identify the test signal as such. For example the pattern within the test signal is already programmed into the receiver and helps the receiver to recognize the test signal.

Furthermore, the receiver can identify the antenna beam, since the test signal comprises an index or something similar to identify the antenna beam. Another possibility is that the receiver and the transmitter are synchronized and that the receiver is aware in which sequence and at what time the transmitter uses a specific antenna or antenna beam direction.

These identified transmitter beams are then sent back to the receiver via feedback in step 65. This can be done by a wireless signal channel or a wire or a cable from the receiver to the transmitter.

In step 66, the transmitter is set to the best transmitter beam which has been previously identified by the receiver in step 64. In step 67, the receiver is going through all antenna beams and receives the transmitted test signal from the transmitter. In step 68, the receiver identifies the best receiver beam by identifying the best transmission quality of the received test signal. In step 69, the flowchart ends and so does one iteration. Afterwards, when the next iteration starts, the whole flowchart starts from the beginning.

FIG. 7 shows another flowchart of a beam forming method. This flowchart comprises the steps 71, 72, 73, 74, 75, 76 and 77. After the start step 71, the flowchart continues to the step 72 wherein the transmitter beams with the best transmission quality between the transmitter and the receiver are determined. Eventually, step 72 is similar to the step 51 of FIG. 6.

Then, the step 72 continues to step 73 which is similar to the step 65 of FIG. 6. Then the flowchart continues to step 74, wherein the best receiver beams are determined, whereby step 74 is similar to the step 52 of FIG. 6.

After these three steps 72 to 74, the iteration is over and the process continues to the decision step 75 wherein e.g. the number of transmitter beams and/or receiver beams is controlled. If only one receiver and/or transmitter beam is left, the flowchart ends at step 77. Otherwise the flowchart goes to step 76, wherein the number of predetermined beams is reduced based on the quality of the transmission signal. Then the flowchart continues to step 72 and repeats this loop until the condition of the decision in step 75 is met. There exist different examples wherein different kinds of decisions are asked at step 75 to stop the loop and end the flowchart, thus the iterations.

The invention claimed is:

1. A method for determining at least one beam of a transmitter and at least one beam of one or more receivers with a specific signal transmission quality between the transmitter and the respective receiver,
wherein the transmitter and each receiver comprise a plurality of predetermined transmitter and receiver beams, respectively,
said method comprising a radiation pattern determination routine with the steps of
transmitting a transmitter training burst for each receiver from the transmitter to the respective receiver, consecutively, wherein the plurality of predetermined transmitter beams of the transmitter is applied during each transmitter training burst in a sequence;
transmitting at least one feedback burst to the transmitter, wherein the feedback burst comprises information based on each transmitter training burst received by the respective receiver, wherein said information identifies at least one transmitter beam of the plurality of predetermined transmitter beams of the transmitter with a specific signal transmission quality for each receiver, wherein a number of the identified at least one transmitter beam is smaller than a number of the plurality of predetermined transmitter beams;
transmitting a receiver training burst for each receiver from the transmitter to the respective receiver, consecutively, wherein the respective transmitter beam with a specific signal transmission quality of the identified at least one transmitter beam of the transmitter for the respective receiver is applied during each receiver training burst;
receiving the receiver training burst by the respective receiver, wherein the plurality of predetermined receiver beams of the respective receiver is applied during each receiver training burst in a sequence;
identifying at least one receiver beam of the plurality of predetermined receiver beams of the respective receiver with a specific signal transmission quality, wherein a number of the identified at least one receiver beam is smaller than a number of the plurality of predetermined receiver beams; and
repeating the radiation pattern determination routine at least once,
wherein the identified at least one transmitter beam and the identified at least one receiver beam of the preceding radiation pattern determination routine are used as a new assortment of the plurality of predetermined transmitter and receiver beams of the succeeding radiation pattern determination routine for the transmitter and the respective receiver.

2. A method according to claim 1, wherein the radiation pattern determination routine is repeated for a predetermined number of times.

3. A method according to claim 1, wherein the receiver beam is set to an at least quasi-omnidirectional beam, while transmitting the transmitter training burst for the first time.

4. A method according to claim 1, wherein the signal transmission quality and the identification of the respective beams are based on the resulting estimated channel delay profile, the channel estimate, the estimated received signal to noise ratio, the estimated carrier to interference ratio and/or the channel characteristics.

5. A method according to claim 1, wherein the transmitter and/or the receiver store the best identified transmitter and receiver beams, respectively.

6. A transmitter apparatus operable to generate a plurality of predetermined transmitter beams and to determine at least one transmitter beam for one or more receiver apparatus with a specific signal transmission quality between the transmitter apparatus and the respective receiver apparatus,
said transmitter apparatus comprising
at least one antenna operable to transmit electromagnetic signals, and
a transmitter beam determination routine, wherein the transmitter apparatus operates
to transmit a transmitter training burst for each receiver to the respective receiver, consecutively, wherein the plurality of predetermined transmitter beams is applied during each transmitter training burst in a sequence;
to receive at least one feedback burst, wherein the feedback burst comprises information based on the at least one transmitter training burst received by the respective receiver, wherein said information identifies at least one transmitter beam of the plurality of predetermined transmitter beams with a specific signal transmission quality for each receiver, wherein a number of the identified at least one transmitter beam is smaller than a number of the plurality of predetermined transmitter beams;
to transmit a receiver training burst for each receiver to the respective receiver, wherein a transmitter beam with a specific signal transmission quality of the identified at least one transmitter beam is applied during the receiver training burst; and
to repeat the transmitter beam determination routine at least once,
wherein the identified at least one transmitter beam of the preceding transmitter beam determination routine is used as the new assortment of the plurality of predetermined transmitter beams of the succeeding transmitter beam determination routine.

7. A transmitter apparatus according to claim 6, wherein the transmitter beam determination routine is repeated for a predetermined number of times.

8. A receiver apparatus operable to generate a plurality of predetermined receiver beams and to determine at least one receiver beam for one or more transmitter apparatus with a specific signal transmission quality between the receiver apparatus and the respective transmitter apparatus,
said receiver apparatus comprising
at least one antenna operable to receive electromagnetic signals, and
a receiver beam determination routine, wherein the receiver apparatus operates
to receive a transmitter training burst for each transmitter from the respective transmitter, consecutively, wherein a plurality of predetermined transmitter beams is applied during each transmitter training burst in a sequence;
to transmit at least one feedback burst to each transmitter, wherein the feedback burst comprises information based on the at least one transmitter training burst received by the receiver apparatus, wherein said information identifies at least one transmitter beam of the plurality of predetermined transmitter beams with a specific signal transmission quality for each transmitter;
to receive a receiver training burst for each transmitter from the respective transmitter, consecutively, wherein a plurality of predetermined receiver beams is applied during the receiver training burst in a sequence;
to identify at least one receiver beam of the plurality of predetermined receiver beams with a specific signal transmission quality, wherein a number of the identified at least one receiver beam is smaller than a number of the plurality of predetermined receiver beams; and
to repeat the receiver beam determination routine at least once,
wherein the identified at least one receiver beam of the preceding receiver beam determination routine is used as the new assortment of the plurality of predetermined receiver beams of the succeeding receiver beam determination routine.

9. A receiver apparatus according to claim 8, wherein the receiver beam determination routine is repeated for a predetermined number of times.

10. A receiver apparatus according to claim 8,
wherein the receiver beam is set to an at least quasi-omnidirectional beam, while transmitting the transmitter training burst for the first time.

* * * * *